(12) United States Patent
Dimitriou et al.

(10) Patent No.: US 7,179,370 B2
(45) Date of Patent: Feb. 20, 2007

(54) ENERGY-EFFICIENT BIOLOGICAL TREATMENT SYSTEM WITH FILTRATION MEMBRANE

(75) Inventors: Michael A. Dimitriou, Richmond, VA (US); Joseph G. Krall, Grafton, WI (US); David Rice, Port Washington, WI (US); Velupillai Yogendran, Warwickshire (GB); Roger J. Byrne, Mequon, WI (US); Kenneth P. George, Grafton, WI (US); John E. Koch, III, Wauwatosa, WI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/439,318

(22) Filed: May 23, 2006

(65) Prior Publication Data
US 2006/0213831 A1 Sep. 28, 2006

Related U.S. Application Data

(62) Division of application No. 10/965,409, filed on Oct. 14, 2004, now Pat. No. 7,118,674.

(51) Int. Cl.
C02F 3/00 (2006.01)

(52) U.S. Cl. .................. 210/151; 210/150; 210/220; 210/615

(58) Field of Classification Search ............ 210/151, 210/150, 220, 615
See application file for complete search history.

(56) References Cited

U.S. PATENT DOCUMENTS 3,472,765 A 10/1969 Budd et al.
3,536,611 A 10/1970 De Filippi et al.

(Continued)

FOREIGN PATENT DOCUMENTS

GB 1166243 10/1969

(Continued)

OTHER PUBLICATIONS

Kang I-J et al.; "Characteristics of microfiltration membranes in a membrane coupled sequencing batch reactor system"; Article; Mar. 5, 2003; pp. 1192-1197; vol. 37, No. 5; Water Research, Elsevier, Amsterdam.

(Continued)

*Primary Examiner*—Chester T. Barry
(74) *Attorney, Agent, or Firm*—RatnerPrestia

(57) ABSTRACT

A membrane filtration system comprising one or more submerged ultrafiltration or microfiltration membrane assemblies at ambient pressure, each membrane assembly positioned 100–240 mm from a nearest wall, baffle, or adjacent membrane assembly and no more than 1 meter above a floor and at least 150 mm below the liquid level. Mixed liquor is discharged underneath each membrane assembly to create a vertical flow velocity in a range of 1–8 mm/second along an entire length of the membrane assembly. In a sequenced batch reactor system, a coarse bubble air diffuser for scouring each membrane assembly is supplied with air only during the backwash cycle of the filtration system and not during the filtration cycle. In a membrane bioreactor system, the biological treatment section is physically separated from the filtration section and fine bubble air diffusion is used in the biological treatment section.

7 Claims, 3 Drawing Sheets

U.S. PATENT DOCUMENTS

| | | |
|---|---|---|
| 3,819,056 A | 6/1974 | Aitken et al. |
| 3,957,648 A | 5/1976 | Roget et al. |
| 4,414,113 A | 11/1983 | LaTerra |
| 4,468,327 A | 8/1984 | Brown et al. |
| 4,605,500 A | 8/1986 | Takemura et al. |
| 4,647,377 A | 3/1987 | Miura |
| 4,715,953 A | 12/1987 | Leonard |
| 4,749,494 A | 6/1988 | Tomoyasu et al. |
| 4,886,601 A | 12/1989 | Iwatsuka et al. |
| 5,192,456 A | 3/1993 | Ishida et al. |
| 5,248,424 A | 9/1993 | Cote et al. |
| 5,254,253 A | 10/1993 | Behmann |
| 5,494,577 A | 2/1996 | Rekers |
| 5,639,373 A | 6/1997 | Mahendran et al. |
| 5,910,250 A | 6/1999 | Mahendran et al. |
| 5,944,997 A | 8/1999 | Pedersen et al. |
| 6,110,374 A | 8/2000 | Hughes |
| 6,126,819 A | 10/2000 | Heine et al. |
| 6,156,200 A | 12/2000 | Zha et al. |
| 6,193,890 B1 | 2/2001 | Pedersen et al. |
| 6,245,239 B1 | 6/2001 | Cote et al. |
| 6,303,035 B1 | 10/2001 | Cote et al. |
| 6,319,411 B1 | 11/2001 | Cote |
| 6,361,695 B1 | 3/2002 | Husain et al. |
| 6,375,848 B1 | 4/2002 | Cote et al. |
| 6,524,481 B2 | 2/2003 | Zha et al. |
| 6,555,005 B1 | 4/2003 | Zha et al. |
| 6,613,222 B2 | 9/2003 | Mikkelson et al. |
| 6,656,356 B2 | 12/2003 | Gungerich et al. |
| 6,682,652 B2 | 1/2004 | Mahendran et al. |
| 6,743,362 B1 | 6/2004 | Porteous et al. |
| 2002/0117444 A1 | 8/2002 | Mikkelson et al. |
| 2003/0070986 A1* | 4/2003 | Braun ........................ 210/620 |
| 2003/0159988 A1 | 8/2003 | Daigger et al. |
| 2004/0035779 A1 | 2/2004 | Vossenkaul et al. |
| 2004/0035786 A1 | 2/2004 | Goldsmith |

FOREIGN PATENT DOCUMENTS

| | | |
|---|---|---|
| WO | WO03/086987 | 10/2003 |

OTHER PUBLICATIONS

European Search Report with written opinion for EP Application No. 05 25 6249 dated Jan. 23, 2006.

The technology: submerged membrane filtration; PURON AG, Aachen, Germany; 6 pages; as posted on http://www.puron.de/en.1200_e_druck.html.

ZenoGem® Membrane Bioreactor Process Description; ZENON Environmental Inc. 2 pages; as posted on http://www.zenonenv.com/markets/zenogem_process_mun.shtml.

Aquamb Process; Aqua-Aerobic Systems, Inc.; Rockford, Illinois; 2 pages; as posted on http://www.aqua-aerobic.com/mpprocess.html.

Aqua MSBR Modified Sequencing Batch Reactor; Aqua-Aerobic Systems, Inc.; Rockford, Illinois; 4 pages; Bulletin #M102 Feb. 2004.

AquaSBR® Sequencing Batch Reactor; Aqua-Aerobic Systems, Inc.; Rockford, Illinois; 6 pages; Bulletin #950C Jan. 2002.

* cited by examiner

ENERGY-EFFICIENT BIOLOGICAL TREATMENT SYSTEM WITH FILTRATION MEMBRANE

CROSS REFERENCE TO RELATED APPLICATIONS

This application is a divisional application of U.S. patent application Ser. No. 10/965,409 filed Oct. 14, 2004 now U.S. Pat. No. 7,118,674, incorporated herein by reference.

FIELD OF THE INVENTION

This invention relates to membrane filtration, specifically microfiltration and ultrafiltration used in biological treatment processes for effluent treatment.

BACKGROUND OF THE INVENTION

Hollow fiber ultrafiltration (UF) or microfiltration (MF) membrane bioreactor (MBR) processes have been used in water and wastewater treatment to provide high levels of finished water treatment. These activated-sludge-type processes typically involve a single basin at ambient pressure containing a series of coarse bubble aeration devices into which single or multiple modules (or groupings) of hollow fiber or plate-type UF or MF membranes are inserted. Waste enters one end of the basin, is mixed with a biomass containing active aerobic organisms, and air is added to provide oxygen. The mixture of biomass and water is referred to as "mixed liquor." The solids in the mixed liquor are referred to as "mixed liquor suspended solids" (MLSS). During aeration, the membrane devices filter the particles of biomass from the liquid substrate.

These membrane filters are typically composed of polymeric materials formed into hollow structures with pores of 0.01 to 0.4 microns in dimension and are open at one or both ends. Multiple membranes are typically arranged on a series of top and/or bottom manifolds which act to distribute air and water. The membranes are attached to these manifolds through a potting system that is known in the art.

An exemplary MBR of the prior art is shown in FIG. 5 and described in more detail in U.S. Pat. No. 6,245,239, incorporated by reference. Reactor 110 comprises a tank 112 that is supplied with feed liquor 114 through inlet 116. The feed liquor typically comprises solids, which may include microorganisms, suspended solids, or other matter. The feed liquor 114 mixes with the tank liquor 118, which typically has greater concentrations of solids, particularly when used for treating wastewater. One or more membrane modules 120 are mounted in the tank and have one or more headers 122 in fluid communication with a permeate side of one or more membranes 106.

Tank 112 is typically kept filled with tank liquor 118 above the level of the membranes 106 in the membrane modules 120 during filtration. Transmembrane pressure (TMP) (differential pressure across the membrane), created by the suction of pump 130 on permeate line 128, causes filtered water, referred to as permeate 124, to flow through the walls of membranes 106 into headers 122 and out through permeate outlet 126. Solids are retained on the surface of the membrane. Periodically, the membranes are cleaned by a reverse flow of permeate 124 or by air sent back through the membrane and out through the filtering pores to remove accumulated matter.

In many systems, such as the one shown in FIG. 5, air from an aeration system 137, comprising an air source such as a blower 142, is bubbled through aerators 138 installed on an aerator manifold 151 located below the membrane modules. Bubbles 136 created by the aerator scour the outer surface of the membranes to remove accumulated particles while also providing oxygen transfer to meet the biological oxygen demand of the tank liquor. An air-lift effect caused by the decreased local density of the water induced by the air bubbles also creates a recirculation pattern 146 in the tank. Typically the hydraulic design of the basin is optimized for the flow velocities required to maximize either the air scouring operation or to keep a specific velocity across the membranes. In some cases air is used in constant or cyclic action to induce the velocities necessary to optimize the filtration process. In most cases coarse bubble diffusers or nozzles located on the basin floor directly below the membrane assemblies are employed to provide a large bubble with features that optimize scouring of the membrane and provide the velocity to induce updraft effects or cross flow action, while still providing oxygen for aeration. Occasionally, a portion of the mixed liquor will be withdrawn at predetermined levels through drain 134 as controlled by drain valve 132 to maintain a specific level of MLSS, typically in the range of 10,000 to 20,000 mg/l.

The designs of such bioreactor basins are typically optimized for the air flow patterns and velocities required by the membranes to achieve required performance. Because these systems are designed to use air to optimize membrane performance, aeration for biological needs is typically a secondary consideration. Because in some cases coarse bubble or nozzle diffusers are used to provide the oxygen, these systems do not optimize the efficiency of the aeration mechanism, resulting in a biological process that is inefficient. Typically a major portion of the costs of operating these systems is the cost of providing air for the biological process through aeration, air for the membranes for air scour and/or backwash, and/or water for backwash.

Although it is known that less aeration is required for scouring the membranes when the solids load is minimal (see, e.g., U.S. Pat. No. 6,303,035 and U.S. Pat. No. 6,375,848), applications with a high MLSS typically utilize substantial coarse bubble aeration, such as is described, for example, in U.S. Pat. No. 6,193,890 and others.

One process, known as the AquaMB Process™ promoted by Aqua Aerobic Systems, Inc., comprises a first stage bioreactor operated to have alternating aerobic and anoxic periods. Following quiescent settling, supernatant from the bioreactor is transferred to a 10 micron cloth media filter. Filtrate from the cloth media filter feeds a membrane system. Although the cloth media filtration step decreases the solids load on the membrane filters (thus allowing fewer membranes and requiring less frequent cleaning of the membranes), the cloth media filtration step adds significant capital and operating expense to the process.

In another biological reactor system design described in U.S. Pat. No. 3,472,765, a stream of high-solids material may be withdrawn from a pressurized biological reactor vessel and recirculated through a membrane separator loop under greater than atmospheric pressure, where turbulent flow through a membrane separator inhibits build-up on the surface of the membrane. The pressure vessels, pumping, and piping required for both the biological portion and the membrane filtration portion of this process are capital and energy intensive for large volume effluent treatment.

Another method for treating wastewater effluent is known as a Sequencing Batch Reactor (SBR). An exemplary SBR is described in U.S. Pat. No. 4,468,327, which discloses an activated sludge wastewater treatment process for reducing pollutants in municipal and industrial waste. The effluent treatment system disclosed in the '327 patent, shown schematically in FIGS. 1 and 2, comprises a tank 1 having a length 3.5 to 6 times its width, an inlet 2 at one end 3, and a decanter 12 at the other end 13. The tank comprises a plurality of submerged air diffusers 7, supplied by air headers 8 and 9, that typically operate cyclically in a sequence that includes a diffusion or aeration period, followed by a rest or quiescent period, followed by a decant period. Aeration allows the activated sludge to treat the incoming biological waste, settling allows the solids to settle, and decanting drains the upper clarified supernatant from the tank of treated water. The total sequence of aeration, settling and decanting stages may typically take 4 hours, 6 hours or 12 hours.

Systems are sized based on the biological mass necessary to reduce the pollutants to be treated stipulated as the food to microbe (F/M) ratio. The SBR described in the '327 patent typically operates with overall F/M ratios of up to 0.4, with immediate F/M ratios of up to 5.

One advantage of an SBR is its ability to continuously accept inflows of wastewater into a single compartmented tank without requiring upstream load balancing. The length and width ratio of the tank prevents short circuiting. The tank typically includes at least one transverse baffle 4 that divides the tank into a first compartment 33 serving as the inlet and at least a second compartment 6 remote from the first. The second compartment may have additional partial or full transverse baffles (30 and 31, respectively) that divide the second compartment into chambers 34 and 35 to help deal with shock organic loads. The volume ratio of the first compartment to the second compartment is typically between about 1:10 to about 1:3. The first portion is typically dimensioned to operate at high immediate F/M ratios of up to 5 units, with biological activity (measured as oxygen uptake rate in units of milligrams of oxygen per gram of mixed liquor suspended solids per hour) of up to 300 and a solids content of up to 15 pounds of biological solids per square foot of vessel floor area. The tank as a whole typically operates at an F/M ratio of up to 0.4.

U.S. Pat. No. 6,613,222 discloses a process comprising a sequencing batch reactor that omits the decanting stage in favor of a process that has a mix fill step, a react fill step, and a react discharge step. Influent enters the SBR during the mix fill and react fill steps, but not during the react discharge step. Aeration is used during the react fill and react discharge step as desired to create aerobic or anoxic conditions. During the react discharge step, flow is discharged from the reactor and circulated through a membrane filtration unit. In one embodiment, two SBRs are used side by side, with one side operating in the mix fill and react fill steps while the other side operates in the discharge step, and vice versa. Like the system described in the '765 patent, the process disclosed in the '222 patent also uses a membrane system in which the mixed solids is pumped through the filtration unit under pressure to force the liquid through the membrane.

It is desirable to provide a system that utilizes membrane filtration in a way that minimizes capital investment and operating cost by enabling the use of membranes to facilitate effluent treatment in systems with submerged membrane modules at ambient pressure-without the need for constant aeration to prevent clogging.

SUMMARY OF THE INVENTION

One aspect of the invention comprises a process for treating effluent in a sequenced membrane batch reactor (SMBR). The process comprises (a) providing a sequenced batch reactor having a biological section and a membrane filtration section; (b) treating the effluent in the biological section, including an aerating step and a settling step; (c) removing the treated effluent in the filtration section; and (d) repeating the aerating, settling and removing steps to treat additional effluent. The treating step comprises (i) passing the effluent continuously into a biological treatment tank provided with at least one transverse baffle across the tank; and (ii) dividing the tank into a first portion adjacent the inlet and a second portion remote from the inlet, the volume ratio of the first portion to the second portion between about 1:10 to about 1:3; (iii) aerating and mixing the effluent at least in the second portion of the tank; and (iv) ceasing the aeration and mixing to allow sludge in the second potion to settle, while still allowing effluent to enter the tank through the inlet. The tank has dimensions that enable operation with sludge having biological activity measured as oxygen uptake rate in units of milligrams of oxygen per gram of mixed liquor suspended solids per hour of up to 300, a solids content of up to 15 pounds of biological solids per square foot of vessel floor area, and F/M ratios in a range of 0.05 to 5. The step of removing the treated effluent in the filtration section comprises providing the membrane filtration section with one or more ultrafiltration or microfiltration membrane assemblies submerged in mixed liquor at ambient pressure, drawing filtrate through the membrane assemblies; and providing air bubble scouring of the membrane assemblies only during periodic backwash cycles of the filtration system, and not during filtration cycles. Each membrane assembly is positioned 100–240 mm from a nearest wall, baffle, or adjacent membrane assembly, and positioned no more than 1 meter above a floor and at least 150 mm below a liquid level line in the membrane filtration section.

The membrane filtration zone may be located in a baffled compartment within the second portion of the tank, in a third portion of the tank separated from the second portion, or the treated effluent from the second portion of the tank may be decanted into the membrane filtration zone. A plurality of biological treatment basins may be provided, with a single membrane filtration zone adapted to receive and process effluent from the plurality of biological treatment basins. The process may comprise directing mixed liquor with a vertical upflow velocity controlled in a range of 1–8 mm/second along an entire length of the membrane.

Another aspect of the invention comprises a membrane filtration system comprising a sequenced batch reactor comprising a biological section and a membrane filtration section comprising one or more ultrafiltration or microfiltration membrane assemblies submerged in mixed liquor at ambient pressure, one or more coarse bubble air diffusers connected to an air source for scouring each membrane assembly; and a controller. The biological section comprises a tank divided into a first portion adjacent a tank inlet and a second portion remote from the tank inlet, wherein a volume ratio of the first portion to the second portion is between about 1:10 to about 1:3, the first portion having dimensions that enable operation with sludge having biological activity measured as oxygen uptake rate in units of milligrams of oxygen per gram of mixed liquor suspended solids per hour of up to 300, a solids content of up to 15 pounds of biological solids per square foot of vessel floor area, and an F/M ratio in the range of 0.05 to 5. Each membrane assembly is positioned 100–240 mm from a nearest wall, baffle, or adjacent membrane assembly, no more than 1 meter above a floor, and at least 150 mm below a liquid level line in the membrane filtration section. The controller is programmed to cause a sequence of steps comprising (a) aerating and mixing the effluent at least in the second portion of the tank; (b) settling the sludge in the second portion of the tank by ceasing the aeration and mixing, yet still allowing effluent to enter the tank through the inlet; (c) removing effluent via the membrane filtration section; and (d) repeating the aerating, settling and removing steps. The controller is further programmed to supply air to the air diffuser for scouring the membranes only during a backwash cycle of the filtration system and not during a filtration cycle.

Yet another aspect of the invention comprises a method of efficiently operating an ultrafiltration or microfiltration membrane assembly submerged in liquid to be filtered by the membrane at ambient pressure. The method comprises directing the liquid to be filtered by the membrane upward from underneath the membrane assembly with a vertical flow velocity controlled in a range of 1–8 mm/second along an entire length of the membrane assembly, the membrane assembly positioned in a compartment defined by vertical walls and/or baffles having a cross-sectional area normal to the flow velocity that is in a range of 9–23% greater than a cross-sectional area defined by a periphery of the membrane assembly normal to the flow velocity, and providing coarse air bubble scouring of the membrane assembly only during a backwash cycle and not during a filtration cycle.

Still another aspect of the invention comprises a process for treating effluent comprising the steps of providing a membrane bioreactor (MBR) having a discrete biological section that is physically separated from a discrete membrane filtration section. The discrete biological section receives substantially continuous feed of effluent and continuous fine bubble aeration. The membrane filtration section is provided with one or more ultrafiltration or microfiltration membrane assemblies submerged in mixed liquor at ambient pressure, each membrane assembly positioned 100–240 mm from a nearest wall, baffle, or adjacent membrane assembly, and positioned no more than 1 meter above a floor and at least 150 mm below a liquid level line in the membrane filtration section. Mixed liquor is directed with a vertical flow velocity controlled in a range of 1–8 mm/second along an entire length of the membrane; and filtrate is continuously drawn through the membrane assemblies, except during periodic backwash cycles.

Treatment in the biological section may comprise providing one or more basins each having a length and width in which the length is 3.5 to 6 times the width, each basin compartmentalized into an anoxic section and an aeration section, the aeration section having an air transfer rate in a range of 0.4 to 0.6 Alpha values and operated at a mixed liquor suspended solids (MLSS) in a range of 2000 to 9000 mg/l. Oxygen transfer efficiency and alpha values are the two commonly used industry standards for determining the effectiveness of an aeration system. Both values are device specific with generally accepted values of 2% per foot of basin area oxygen transfer efficacy for fine bubble diffusers and 0.75% oxygen transfer efficacy for coarse bubble diffusers. The alpha value is the ratio of the oxygen mass transfer coefficient of a diffuser in wastewater compared to the oxygen mass transfer coefficient of the same diffuser in clean water. The lower the alpha value, the higher the oxygen requirement.

In typical wastewater treatment plant applications, the alpha value for coarse bubble diffusers is 20% higher than fine bubble diffusers.

A typical example a coarse bubble diffuser aeration system operating in a basin with 15 foot water depth will have a clean water efficiency of 12%. The same device in wastewater will have an efficiency of 10%. The alpha ratio then becomes 10/12 or 0.83, which is typical of a coarse bubble diffuser. A fine bubble diffuser will have a clean water efficiency with a 15 foot water level of 32% in clean water and 20% in wastewater. Which yields an alpha value of 0.625.

A plurality of membrane assemblies may be provided in the membrane filtration section, each membrane assembly separated from adjacent membrane assemblies by a baffle. The floor underneath the membrane assembly may be provided with a slope from a deeper end for accommodating a mixed liquor discharge manifold adjacent one end of the membrane assembly to a shallower end adjacent an opposite end of the membrane assembly, the slope of the floor angled to direct flow from the discharge manifold upward toward the membrane assembly.

Still another aspect of the invention comprises an improvement in a process for treating effluent comprising a biological treatment process in which filtrate is drawn through one or more ultrafiltration or microfiltration membrane assemblies submerged in mixed liquor at ambient pressure and in which aeration is provided for scouring the membrane and for providing oxygen transfer. The improvement comprises providing a separate biological treatment section and a separate filtration section; optimizing design of the biological treatment section for oxygen transfer efficiency by providing fine bubble aeration; and optimizing design of the filtration section by positioning each membrane assembly 100–240 mm from a nearest wall, baffle, or adjacent membrane assembly and no more than 1 meter above a floor and at least 150 mm below a liquid level line in the membrane filtration section; directing mixed liquor with a vertical flow velocity controlled in a range of 1–8 mm/second along an entire length of the membrane assembly.

Yet another aspect of the invention comprises a membrane bioreactor (MBR) comprising a discrete biological section is physically separated from a discrete membrane filtration section. The is biological section adapted to receive substantially continuous feed of effluent and includes one or more fine bubble air diffusers connected to an air source provides dissolved oxygen. The membrane filtration section comprises one or more ultrafiltration or microfiltration membrane assemblies submerged in mixed liquor at ambient pressure, one or more feed pumps connected to a discharge manifold for recirculating liquid to be filtered by the membrane assemblies, one or more pumps for continuously drawing filtrate through the membrane assemblies, except during periodic backwash cycles, and one or more coarse bubble air diffusers scour the membranes primarily during a backwash cycle of the filtration system and optionally during the filtration cycle. Each membrane assembly positioned 100–240 mm from a nearest wall, baffle, or adjacent membrane assembly, and positioned no more than 1 meter above a floor and at least 150 mm below a liquid level line in the membrane filtration section. The feed pump discharge manifold comprises an outlet underneath each membrane assembly sized to provide a discharge volume that creates a vertical flow velocity in a range of 1–8 mm/second along an entire length of the membrane assembly.

DETAILED DESCRIPTION OF THE INVENTION

Figure 1:
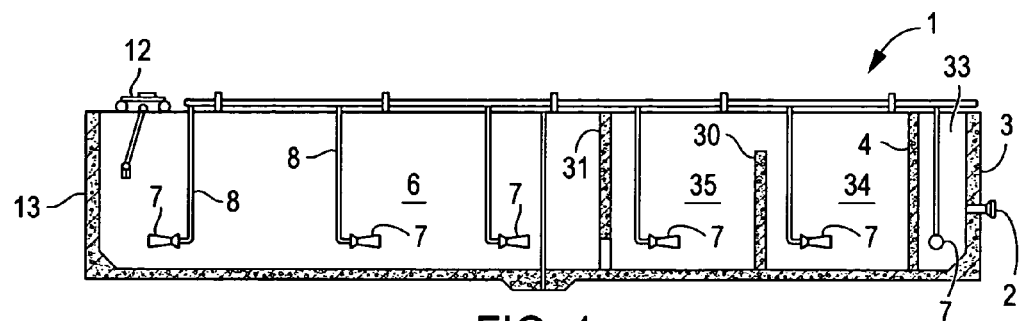
FIG. 1 is a longitudinal section view of a SBR design of the prior art.

The invention generally comprises a method for optimizing a biological filtration process that uses submerged ultrafiltration or microfiltration membranes at ambient pressure. In the case of a membrane bioreactor (MBR), the method comprises separating the filtration and biological steps into separate compartments and optimizing the hydraulic characteristics for each compartment to minimize air and energy consumption. In the case of a sequenced membrane batch reactor (SMBR) process, the method comprises taking advantage of the low solids present after a settling and/or decanting step to increase throughput of the membrane filtration system and to operate the membrane without coarse bubble scouring during the filtration cycle.

Maximizing cross flow velocities across the membrane induces optimum membrane performance. It is desirable to provide the membrane with an upward flow of liquid with velocities beginning across the base of the membranes and continuing upward in the range of 1 to 8 mm per second along the entire length of the hollow fiber or plate type ultrafiltration or microfiltration membrane. Higher solids concentrations in the mixed liquor typically require velocities on the higher end of the velocity range, whereas velocities on the lower end of the range are adequate for lower solids concentrations.

The incoming flow should be hydraulically balanced and directed upwards into the base of each membrane assembly. Any overflow from the membrane section can be returned to the biological section(s) of the system or from the aeration basin to the membrane section and back to the aeration section to provide recirculation for biological activity, in many cases by gravity, but pumping may also be employed. The mixed liquor is typically recirculated within the membrane section of the system to induce the velocities required. A variable speed pump may be ideal for controlling flow rate and velocity. Any type of pumping and flow control may be used, however.

Single or multiple assemblies of hollow fiber or plate type membranes should be arrayed no more than about 1 meter above the basin floor and at least 150 mm below the liquid level and spaced within a range of about 100–240 mm from the nearest wall, baffle, or adjacent membrane assembly. Less than 1 meter spacing from the basin floor prevents solids build-up below the membrane and also minimizes the head requirements for the pumps that provide the distribution of liquid below the membranes. The spacing from the wall or baffle prevents too much pumping energy from being dissipated around the outside of the membrane. For example, for a membrane assembly having dimensions of 2000 mm×2500 mm, the area between the membrane assembly and the wall with the 100–240 mm spacing range is approximately 9–23% of the area inside the boundary of the membrane assembly. Given that pumping energy is proportional to the volume of liquid pumped per minute past the membranes (which is proportional to the cross-sectional area of the basin, assuming that the liquid is pumped through the entire cross-sectional area at the same velocity), the larger the spacing between the wall and the membrane, the more energy wasted on pumping fluid that falls outside of the membrane area. For a membrane assembly having a height of 2–3 meters, the spacing of no more than 1 meter above the floor is less than 50% of the height of the membrane.

Particularly for mixed liquor in which MLSS is greater than about 2500 mg/l, such as is present in an MBR system, velocity control structures comprising baffle walls separating each membrane assembly may be used to compartmentalize each membrane assembly. The velocity control structures help focus the localized upward velocities desired to maintain efficient filtration.

Pilot studies operating an SMBR system under the above conditions, showed the membrane could filter efficiently and effectively without the need of constant aeration. Cyclic aeration may be used during a backwash cycle to provide a surface wash action in combination with water pumped back through the membrane in a timed backwash sequence. Operation of the membrane system is typically cyclic, comprising a filtering cycle followed by backwash cycle with/or without an air scour stage.

Typically, air bubble scouring provided during the backwash cycle has a duration of about $\frac{1}{12}$ to $\frac{1}{40}$ of the filtration time. Using air only during the backwash cycle to clean the membrane, rather than continuously, results in significant energy reduction versus prior art systems. When high solids levels are encountered, such as in an MBR system, however, the use of air scour during the filtration cycle also may be desirable. Using submerged membranes at ambient pressure with relatively low head requirements minimizes the energy required to pump the recirculated liquid past the membrane at the desired flow velocity to keep the membrane clean. It should be noted that even in the SMBR sytem where no air scouring is required during the filtration cycle, a minimal amount of air (about 0.5 scfm) may still be provided to keep the air headers free of sediment, but such air is not considered to have significant enough volume to provide air scouring.

Chemical cleaning is typically required at 90–180 day intervals. An exemplary cleaning process involves soaking the membranes in solutions of Hypochlorite, NaOCL, citric acid and/or surfactant-based detergents for periods of 4–8 hours, although any cleaning process known in the art may be used. Intermittent "Clean In Place" maintenance washes on a weekly or monthly basis, in which the membranes are backwashed with chlorine or citric acid solutions for 4 minute periods may also be used, depending on raw water characteristics. Pilot testing showed that operating the system with sludge ages exceeding 30 days improved the performance of the membrane system by extending the time between chemical cleanings.

Although any type of membrane system known in the art may be used, one suitable embodiment comprises membrane assemblies comprising hollow filter membranes, such as but not limited to, filter modules manufactured by Puron AG of Aachen, Germany.

Sequencing Membrane Batch Reactor (SMBR)

Figure 3:
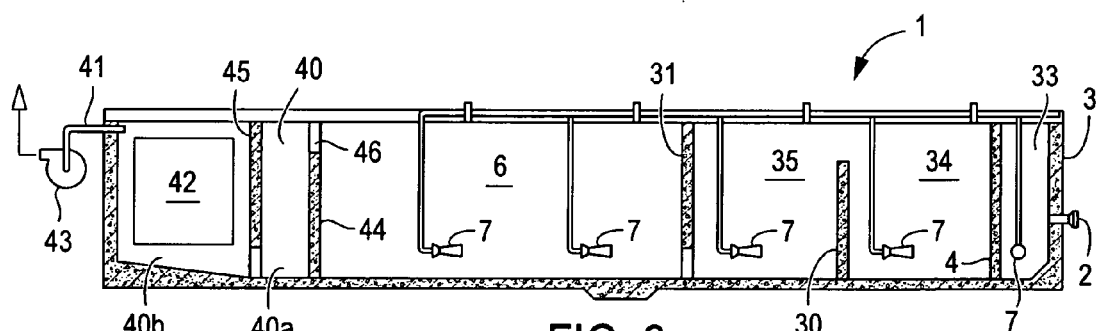
FIG. 3 is a longitudinal section view of a membrane SBR (MSBR) embodiment of the present invention.
Figure 4:
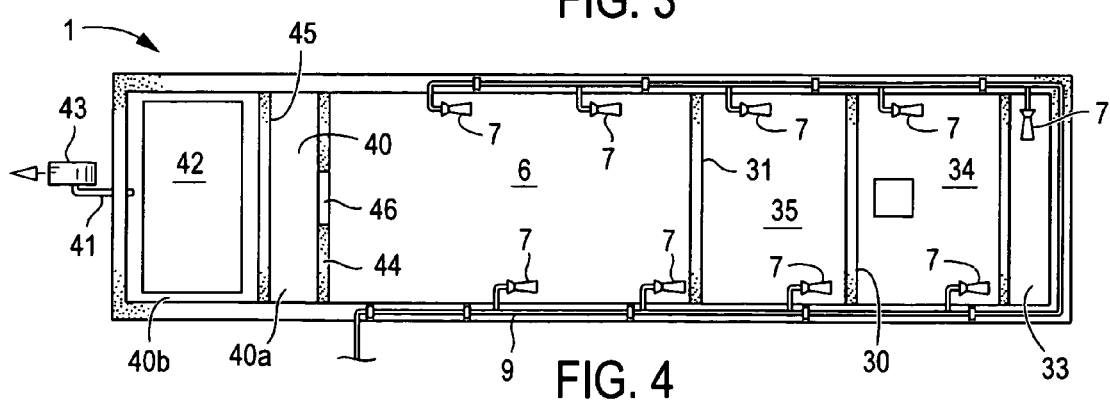
FIG. 4 is a plan view of the MSBR of FIG. 3.

Referring now to FIGS. 3 and 4, the SBR system described in the '327 patent can be improved by adding a compartment 40 comprising an assembly of hollow fiber or plate type membranes 42 positioned relative to the walls and floor as described above. The use of ultrafiltration or microfiltration allows further treatment of the effluent resulting in an overall reduction in pollutant loads. The filtration step may eliminate the need for a decant stage, allowing the effluent treatment system to operate in a more continuous manner, increasing the overall hydraulic throughput of the system and reducing system footprint and associated costs.

Figure 2:
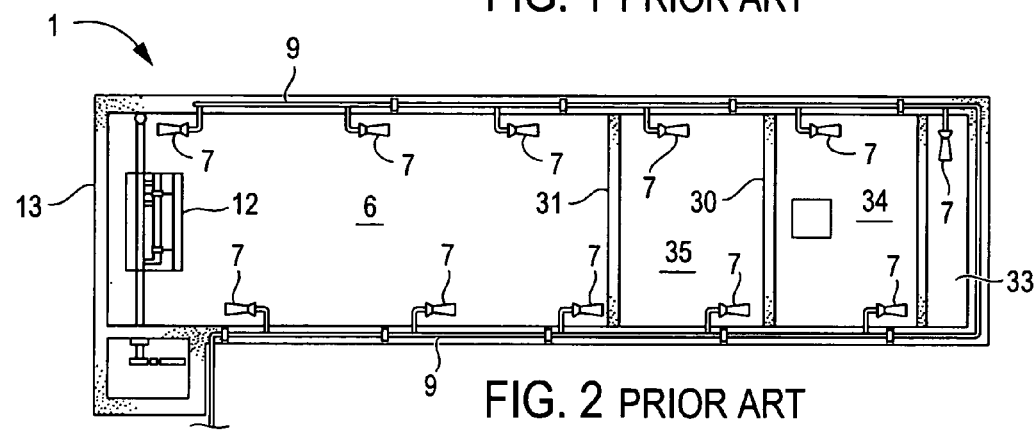
FIG. 2 is a plan view of the SBR of FIG. 1.

In one embodiment, the SBR as described in the '327 patent may be divided with another transverse baffle 44 to form third compartment 40 into which the settled effluent is directed through a weir 46 or gate valve type device (not shown) for the decant/filtration stage. Another transverse baffle 45 may direct the fluid flow up underneath the membranes 42. A sloped bottom underneath the membranes may further assist in creating an upflow past the membranes. In another embodiment (not shown), membranes 42 may be located directly in the second compartment 6, optionally separated from the rest of the compartment by one or more baffles, such as baffle 45, to create upflow, and may operate either continuously or intermittently, filtering during the aeration and/or decant stages. In still other embodiments, however, decanting combined with filtration may be used, including an embodiment in which decanter 12 as shown in FIGS. 1 and 2 feeds a separate basin containing a membrane filtration module installed and operated as described herein. The separate basin may have a configuration similar to filtration section 54 shown in FIGS. 7 and 8. The decanted liquid may be pumped into the separate basin from underneath the membranes with an upflow velocity in a range of 1 to 8 mm/s. In one construction, transverse baffle 45 shown in FIGS. 3 and 4 may be a solid wall with compartment 40a serving as a feed chamber for the suction of a pump (not shown) and compartment 40b receiving the pump discharge underneath the membranes 42, similar to the configuration shown in FIG. 8.

To balance and stabilize the solids level throughout the SMBR, but specifically in the membrane zone, a portion (typically about 10–20%) of the total flow in the membrane zone is recycled from the membrane section back to the inlet of the SMBR by gravity or pumping. In one embodiment, in which each membrane module is enclosed on all sides by baffles or walls, the membrane modules are backwashed together as a group while the feed to the membrane zone is shut off. A collector manifold 41 mounted at the normal operating liquid surface line receives liquid flow equivalent in volume to the backwashed flow and returns that liquid by gravity or through a pump 43 to the inlet of the SMBR.

In order to further optimize the system, multiple pass configurations may be used which operate sequentially with one another. In such a configuration, the multiple pass aeration systems decant alternately into a separate membrane zone allowing the membrane system to operate continuously. For example, in an exemplary four pass system, the Aeration, Settling, and Decanting/Filtration steps may be coordinated as indicated in the table below:

|  | Hours | | | | | | | |
|---|---|---|---|---|---|---|---|---|
|  | 1 | 2 | 3 | 4 | 5 | 6 | 7 | 8 |
| Unit 1 | Aeration | | | | Settling | | Decant/Filter | |
| Unit 2 | Decant/Filter | | Aeration | | | | Settling | |
| Unit 3 | Settling | | Decant/Filter | | Aeration | | | |
| Unit 4 | Aeration | | Settling | | Decant/Filter | | Aeration | |

In this configuration and operating mode, flow to the membranes is essentially continuous, allowing for greater efficiency in operation as well as reducing the overall footprint of the system by allowing a single filter to serve multiple biological treatment units. It should be noted that any number of multiple units may be used with a single filtration unit, and that the duration of each cycle may be of any length as desired to optimize a particular system.

Whereas the SBR system described in the '327 patent discloses operation with an overall F/M ratio of up to 0.4, the use of a membrane in conjunction with an SBR system as described herein allows operation with F/M ratios in a range of 0.05 to 5.

Improved Membrane Bioreactor (MBR) Design

Another aspect of the invention comprises improving existing MBR processes by allowing incorporation of the high efficiencies of fine bubble aeration diffuser systems and bioreactor design with immersed membrane technology in a unique way that reduces total operating costs for the process while maintaining system process efficiencies. The improved bioreactor design comprises a dual stage bioreactor process comprising a biological section that is separate from the filtration section. Separating the biological section from the filtration section allows optimization of the process efficiency of both parts of the process. In order to improve the filtration section performance, the membrane filtration basin of the MBR is designed with different hydraulic characteristics than the biological basin to maximize the cross flow velocities across the membrane and to induce optimum membrane performance. Similarly, the aeration system of the biological section can be optimized for oxygen transfer to facilitate the biological process.

Figure 6:
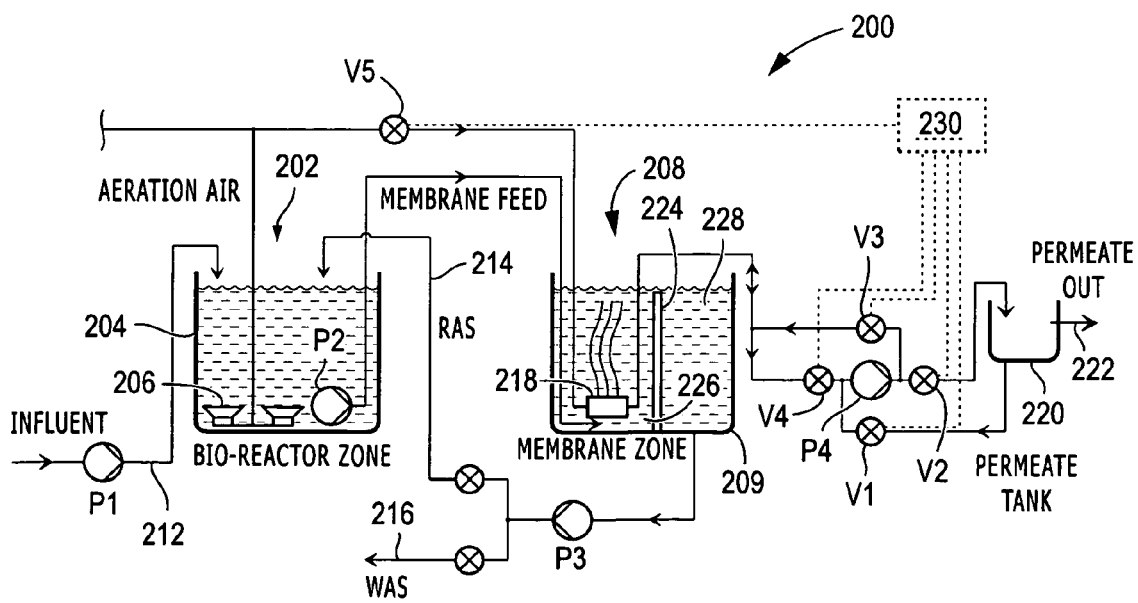
FIG. 6 is a schematic illustration of an exemplary dual stage membrane bioreactor of the present invention.

Referring now to FIG. 6, a dual stage membrane bioreactor process 200 may be provided in which the biological treatment section 202 is designed as a separate stage of the process in first tank 204 using highly efficient air diffusion devices 206, for example, fine bubble aeration systems manufactured by ITT Sanitaire, configured in a hydraulic profile that optimizes air transfer for the biological section. A separate membrane section 208 may then be configured to optimize the hydraulics of the membrane portion of the system, improving overall filtration efficiency.

Influent 212 enters the system through pump P1 and is aerated in biological treatment tank 204. Pump P2 supplies liquor to membrane filtration tank 209, maintaining the water upflow velocity as described above to keep the membranes clear of accumulation instead of using coarse air diffusion. Overflow from the membrane filtration tank 208 is recirculated to the biological treatment tank 204 via pump P3 and recirculation line 214 with a solids purge periodically drawn off from the system through solids outlet 216 to keep the system MLSS in the desired range. Permeate is drawn through membrane 218 via pump P4 and sent to permeate tank 220, which can serve as a supply of permeate for backflushing periodically. Permeate overflows permeate tank 220 through outlet 222.

Figure 5:
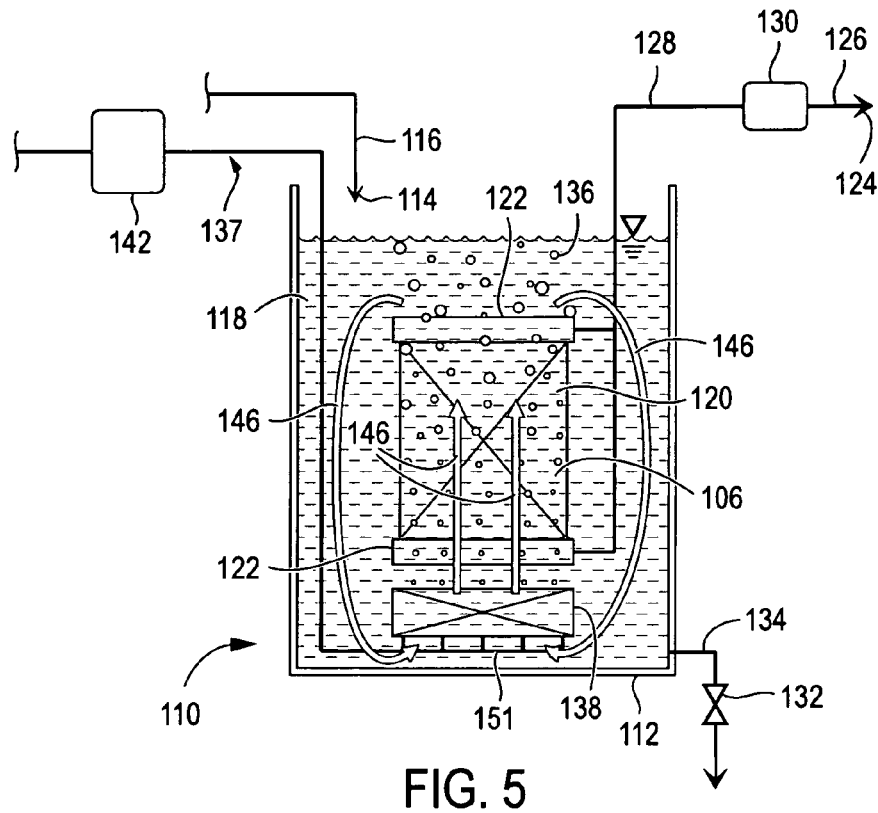
FIG. 5 is a schematic illustration of an exemplary membrane bioreactor (MBR) of the prior art.

Controller 230, such as a programmable logic controller, computer, distributive control system, or the like, may be used to control the filtration and cleaning steps of the membrane (and is typically connected to other control elements of the system as well, such as pumps, level controllers, solids discharge valves, and the like, but such connections are not depicted for simplicity of the drawing). With valves V4 and V2 open and valves V1 and V3 closed, pump P4 pulls permeate through the membrane during a filtration step. With valves V1 and V3 open and V2 and V4 closed, pump P4 supplies permeate from permeate tank 220 for backflushing the membrane during a backflushing step. Air valve V5 can then be opened during the backflush step to supply air through the coarse bubble diffusers integral to the membrane assembly to assist in removing solids. Baffle 224 in membrane filtration tank 209 divides the tank into a filtration compartment 226 and a pump feed compartment 228, enabling the desired upward flow velocity to be maintained past the membrane in the filtration compartment and a downward flow velocity toward the suction of pump P3 in the pump feed department. The overall process is more efficient in operation when compared to the process depicted in FIG. 5, because the air diffusion can be optimized for oxygen transfer in tank 204, and used only minimally for scouring the membrane during the filtration cycle, as dictated by solids loading, and primarily during the backflush cycle in tank 208, resulting in lowered operating costs, as well as improved maintenance requirements.

Efficiencies in the biological process are measured in units of oxygen transfer. Aeration process efficiency can be measured and expressed as the actual amount of oxygen in ambient air blown into the water to be treated. This is measure and expressed as the Alpha value, or AS, expressed on a scale of 0.1 to 1.0, with 1.0 indicating 100% transfer of the actual available oxygen of an air source into the liquid and 0.1 indicating 10% transfer. The air transfer rate achieved by an exemplary dual stage membrane bioreactor of the present invention is on the order of 0.6 AS. Air transfer rates for single basin membrane bioreactors known in the art are typically in the range of 0.18 to 0.45 AS. The resulting increase in oxygen transfer efficiency increases the efficiency of the biological reduction of the pollutants to be treated. To achieve these efficiencies, the aeration basin is typically designed with specific length, width, and depth considerations to allow for specific hydraulic flow patterns that achieve dispersion of the air and induce mixing in the aeration section. A velocity through the aeration basin in a range of typically about 2–4 mm/second is desired to achieve proper mixing and distribution of the air into the waste stream.

Figure 7:
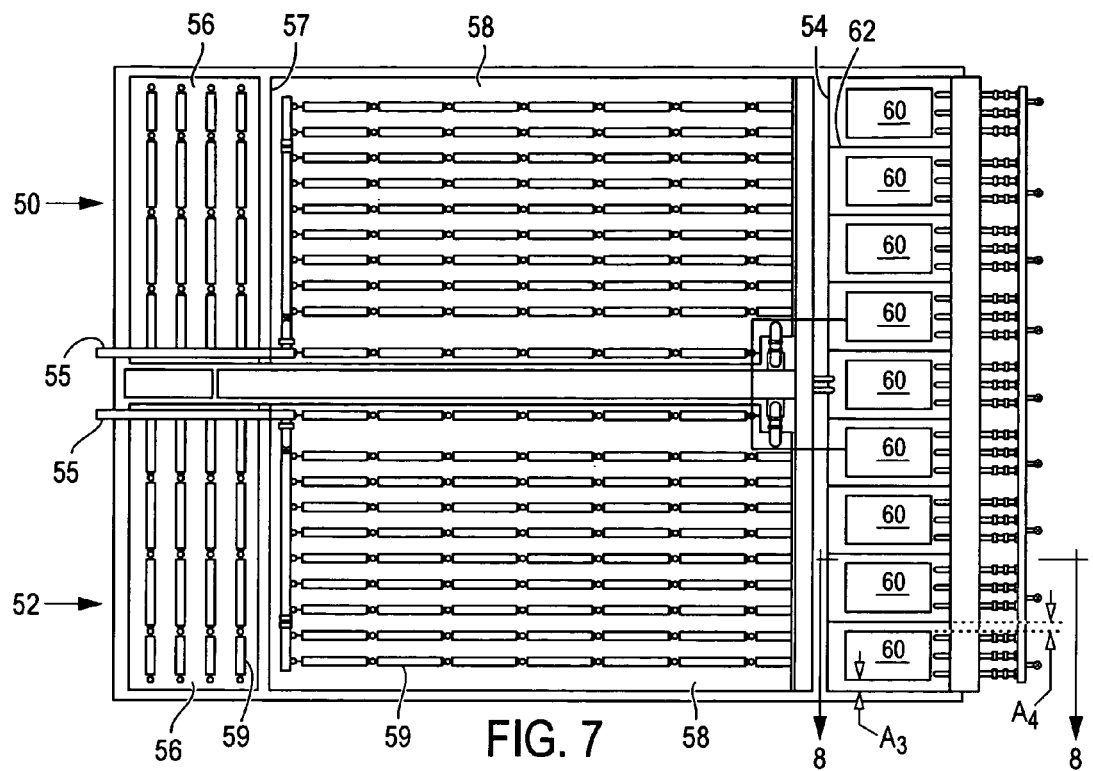
FIG. 7 is a plan view of an exemplary MBR design embodiment of the present invention.

Another exemplary MBR system is shown in FIG. 7, comprising two parallel biological treatment sections 50 and 52, and a single membrane filtration section 54. Each biological treatment section has an anoxic zone 56 and an aeration zone 58, each section having a plurality of fine bubble air diffusers 59. The biological treatment sections 50 and 52 are preferably sized to have a length that is 3.5 to 6 times its width. Transverse baffles 57 may be provided to deal with shock loads.

Figure 8:
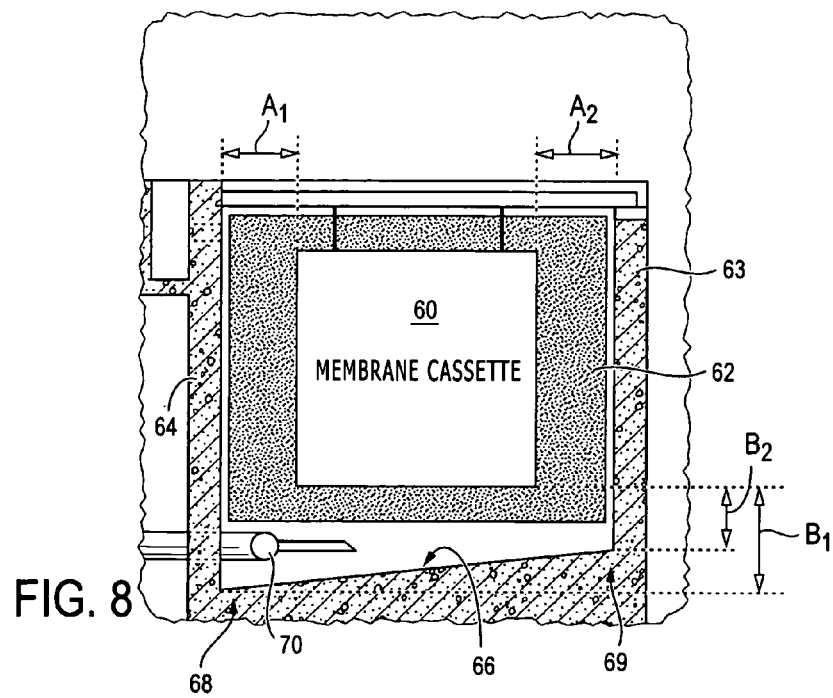
FIG. 8 depicts an exemplary mounting arrangement for a membrane cassette in accordance with the present invention, viewed along line 8—8 in FIG. 7.

Membrane filtration section 54 comprises a plurality of membrane cassette units 60, with adjacent units separated by baffles 62. Each baffle 62 typically extends the entire length (depth) as the membrane itself. In fact, it is highly desirable, particularly where the membranes will experience relatively high solids concentrations (>1000 mg/l), that the membranes are surrounded on all four sides by walls or baffles that extend at least the same length (depth) as the membrane. As noted previously and as shown in more detail in FIGS. 7 and 8, the distance $A_1$–$A_4$ from the edge of each membrane cassette unit 60 to the nearest wall 63, 64 or baffle 62 is in the range of 100–240 mm. The floor 66 of the membrane filtration section 54 is sloped as shown in FIG. 8 from a deeper end 68, having a distance $B_1$ between the floor and the bottom of the membrane cassette to a shallower end 69 having a distance $B_2$ between the floor and the bottom of the membrane cassette. The deeper portion 68 accommodates the mixed liquor distribution manifold 70 and associated piping, whereas the upward slope angled toward the shallower end helps to direct the mixed liquor discharged by the manifold upward through the membrane cassette.

The waste stream enters the anoxic section 56 after screening and de-gritting (not shown). Air, typically generated by a compressor assembly (not shown), is delivered through the series of diffusers 59 mounted on a header system 55 and arranged on the bottom of the aeration tank in such a way as to optimize air transfer into the liquid. A dissolved oxygen probe (not shown) may be used to measure and record oxygen levels in the aeration zone and to provide feedback to a control system, such as a programmable logic controller (PLC), to adjust air flow as required to maintain dissolved oxygen at a desired set point. MLSS may be monitored by the use of MLSS monitors in both aeration sections 58 and the filtration section 54, and controlled by the PLC by opening and closing waste sludge valves to maintain a desired MLSS setpoint.

The waste stream is pumped from the aeration zone into the membrane filtration zone in which flow velocities are optimized by positioning of the membrane assemblies and by distribution of the flow as described above. The membranes are cleaned by air or water backwash, typically on a timed cycle, such as controlled by the PLC. The fluid containing the MLSS is recycled to either or both of the aeration zones 58 by gravity from the membrane section. Gravity recycle is possible because the liquor is pumped into the membrane section with an upflow, typically causing the membrane zone to have a higher fluid level than the previous zones, allowing the recycle to overflow to the previous zones. The membrane filtration is typically cyclic, comprising a filtration cycle, a backwash cycle, and an air scour cycle. Water is typically drawn through the submerged membranes via a vacuum pump or similar device connected to the permeate side of the membrane. Backwash is typically powered by a separate pump, or by gravity, by reversing the flow of treated water back through the membranes.

EXAMPLE

A pilot study was conducted on an effluent treatment process having municipal raw waste feed of approximately 2–4 gpm, pretreated by coarse screening to 3 mm. The average flow characteristics included BOD5 at 200–300 mg/l, suspended solids at 150–250 mg/l, and ammonia at 25–35 mg/l. The membrane zone of the pilot unit was equipped with hollow fiber ultrafiltration membranes that were installed and optimized to derive the dimensional (positioning from nearest wall, floor, liquid level line) and operational (vertical flow velocity) parameters disclosed and claimed herein. Operation was conducted at an MLSS of between 3,500 and 8,000 mg/l and FM ratios from 0.01 to 1.5. Optimum biological aeration and air scour/backwash efficiency were achieved at a loading F/M ratio of 0.05–5. Cleaning cycles were also optimized in this range. The pilot was operated in both a continuous mode as an MBR and in a cyclic mode as an SMBR (in which the MLSS in the decant/filtration stage was allowed to reduce to 1000 mg/l). The membrane was operated at 20 lhr/m2 using a cycle of 4 minute filtration, 30 second water backwash, and 10 second air scour.

Finished water quality for the test included a BOD5 of 1–3 mg/l, suspended solids less than 1 mg/l, turbidity less than 0.3 NTU, and total nitrogen less than 3 TKN. Phosphorus was reduced to less than 1 mg/l through the use of ferric addition in the biological section Although the membranes were tested at MLSS ranges of 10–10,000, it was found that membranes operated most efficiently in an MLSS range of 100–1000 mg/l (SMBR mode, in which the solids concentration in the feed to the membrane zone are typically less than 2500 mg/l). In these ranges, the settling and decant stages were combined and duration minimized to less than 2 hours. It was found that overall system operation was its most efficient when operated with an aeration step for about 2–6 hours, a decant step for 1 hour, and a filter step for about 2–5 hours.

The pilot work showed that operation in an MBR mode (solids concentration in the feed to the membrane zone typically greater than 2500 mg/l), using fine bubble diffusers with physical separation between the biological and membrane zones, provided an air transfer efficiency of 25–30% when operating at MLSS levels of between 4,000 and 9,000 mg/l. An upflow velocity of 4 mm/minute was found optimal at an MLSS level of 8–9,000 mg/l. This same membrane bioreactor pilot unit, when operated at MLSS of 10,000 to 15,000 using coarse bubble aeration and single compartment operation typical of the prior art, showed a reduction in transfer efficiency to 9%. Operation within the dimensional and operational parameters claimed and described herein, including fine bubble aeration in the biological zone, resulted in a reduction of 30–50% in the total air flow required to operate the biological section when compared to a typical single basin MBR. An energy reduction of 20% was also experienced in the operation of the membranes in the claimed configuration due to a reduction in the need for the volume of air scour air for the membrane, even during operation in MBR mode.

Operating within the claimed parameters, at MLSS levels of 6–12,000 mg/l, the pilot studies showed the membrane could filter efficiently and effectively without the need for continuous air scour across the membranes. The pilot studies showed that optimum operation cycles were 4–10 minutes filtering followed by 30 seconds of backwash with 20 seconds of air scour over the surface of the membrane (a range of $1/12$ to $1/30$ air scour to filtration time ratio).

Applicability to Other Types of Filtration Processes

Although discussed primarily in the context of a municipal waste effluent treatment system, it should be understood that the term "effluent" as used herein is not limited only to municipal waste effluent, but should be broadly interpreted to refer to any feed stream to the systems described herein. The novel method of positioning and operating membrane filtration systems disclosed herein may be used for drinking water treatment, industrial process filtration, or any type of fluid treatment or filtration process known in the art. While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A membrane filtration system comprising:

a sequenced batch reactor comprising a biological section and a membrane filtration section, the biological section comprising a tank divided into a first portion adjacent a tank inlet and a second portion remote from the tank inlet, wherein a volume ratio of the first portion to the second portion is between 1:10 to 1:3, the first portion having dimensions that enable operation with sludge having biological activity measured as oxygen uptake rate in units of milligrams of oxygen per gram of mixed liquor suspended solids per hour of up to 300, a solids content of up to 15 pounds of biological solids per square foot of vessel floor area, and a food-to-microbe ratio (F/M ratio) in a range of 0.05 to 5;

the membrane filtration section comprising one or more ultrafiltration or microfiltration membrane assemblies submerged in mixed liquor at ambient pressure, each membrane assembly positioned 100–240 mm from a nearest wall, baffle, or adjacent membrane assembly, and positioned no more than 1 meter above a floor and at least 150 mm below a liquid level line in the membrane filtration section;

one or more coarse bubble air diffusers, connected to an air source, for scouring each membrane assembly; and a controller programmed to cause a sequence of steps comprising (a) aerating and mixing the effluent at least in the second portion of the tank; (b) settling the sludge in the second portion of the tank by ceasing the aeration and mixing, yet still allowing effluent to enter the tank through the inlet; (c) removing effluent via the membrane filtration section; and (d) repeating the aerating, settling and removing steps, the controller further programmed to supply air to the air diffuser for scouring the membranes only during a backwash cycle of the filtration system and not during a filtration cycle.

2. The system of claim 1 further comprising a plurality of membrane assemblies separated from one another by baffles.

3. The system of claim 1 further comprising one or more pumps connected to a discharge manifold for recirculating liquid to be filtered by the membrane, the discharge manifold having an outlet underneath each membrane assembly and sized to provide a discharge volume that creates a vertical flow velocity in a range of 1–8 mm/second along an entire length of the membrane assembly.

4. The system of claim 3 wherein the floor underneath the membrane assembly has a slope from a deeper end for accommodating the discharge manifold adjacent one end of the membrane assembly to a shallower end adjacent an opposite end of the membrane assembly, the slope of the floor angled to direct flow from the discharge manifold upward toward the membrane assembly.

5. A membrane bioreactor (MBR) comprising:

a discrete biological section physically separated from a discrete membrane filtration section, the discrete biological section adapted to receive substantially continuous feed of effluent;

one or more fine bubble air diffusers, connected to an air source, for providing dissolved oxygen in the biological section;

one or more ultrafiltration or microfiltration membrane assemblies submerged in mixed liquor at ambient pressure in the membrane filtration section, each membrane assembly positioned 100–240 mm from a nearest wall, baffle, or adjacent membrane assembly, and positioned no more than 1 meter above a floor and at least 150 mm below a liquid level line in the membrane filtration section;

one or more feed pumps connected to a discharge manifold for recirculating liquid to be filtered by the membrane, the discharge manifold having an outlet underneath each membrane assembly and sized to provide a discharge volume that creates a vertical flow velocity in a range of 1–8 mm/second along an entire length of the membrane assembly;

one or more filtrate pumps for continuously drawing filtrate through the membrane assemblies, except during periodic backwash cycles; and one or more coarse bubble air diffusers, connected to the air source, for scouring the membranes primarily during the backwash cycle and optionally during a filtration cycle.

6. The membrane bioreactor of claim 5 further comprising a plurality of membrane assemblies separated from one another by baffles.

7. The membrane bioreactor of claim 6 wherein the floor underneath the membrane assembly has a slope from a deeper end for accommodating the discharge manifold adjacent one end of the membrane assembly to a shallower end adjacent an opposite end of the membrane assembly, the slope of the floor angled to direct flow from the discharge manifold upward toward the membrane assembly.

\* \* \* \* \*